(12) United States Patent
Mitchell et al.

(10) Patent No.: US 10,577,838 B2
(45) Date of Patent: Mar. 3, 2020

(54) OVERSLAM BUMPER FOR VEHICLE DOOR LATCH

(71) Applicant: Magna Closures Inc., Newmarket (CA)

(72) Inventors: John Robert Scott Mitchell, Newmarket (CA); Ioan Dorin Ilea, Vaughan (CA); James Joseph Ferri, Maple (CA)

(*) Notice: Subject to any disclaimer, the term of this patent is extended or adjusted under 35 U.S.C. 154(b) by 237 days.

(21) Appl. No.: 14/458,469

(22) Filed: Aug. 13, 2014

(65) Prior Publication Data

US 2015/0076835 A1  Mar. 19, 2015

Related U.S. Application Data

(63) Continuation of application No. PCT/CA2013/000134, filed on Feb. 15, 2013.
(Continued)

(51) Int. Cl.
*E05B 77/38*  (2014.01)
*B60N 2/36*  (2006.01)
(Continued)

(52) U.S. Cl.
CPC ............. *E05B 77/38* (2013.01); *B60N 2/366* (2013.01); *E05B 83/18* (2013.01); *E05B 85/20* (2013.01);
(Continued)

(58) Field of Classification Search
CPC ......... Y10T 292/1078; Y10T 292/1082; Y10T 292/1043; Y10T 292/1044;
(Continued)

(56) References Cited

U.S. PATENT DOCUMENTS 3,371,948 A * 3/1968 Velavicius ............ E05B 85/243
  292/216
3,380,771 A * 4/1968 Rogers, Jr. .............. E05B 77/48
  292/216
(Continued)

FOREIGN PATENT DOCUMENTS

GB          2402961 A      12/2004
JP        S 58-17979 A  *   2/1983
WO         0012853 A1       3/2000

OTHER PUBLICATIONS

Computer Generated Translation for JPS 58-17979 A, Generated on Jun. 4, 2019, https://worldwide.espacenet.com/ (Year: 2019).*
(Continued)

*Primary Examiner* — Alyson M Merlino

(57) ABSTRACT

A closure panel latch assembly can include an overslam bumper mechanism comprising a biasing element as a spring formed from a metallic material positioned relative to a slot of the latch assembly. The biasing element resists entry of a striker into the slot beyond a selected position in order to inhibit contact of the striker with a bottom end of the slot. Also provided is a closure panel latch assembly configured with the biasing element as a resilient element positioned relative to the slot of the latch assembly; The biasing element is coupled to the striker engagement member, such that the striker engagement member is positioned to engage the striker and resist travel of the striker towards the bottom end, wherein the biasing element controls the resistance to movement of the striker engagement member by the striker.

16 Claims, 6 Drawing Sheets

Related U.S. Application Data

(60) Provisional application No. 61/600,314, filed on Feb. 17, 2012.

(51) Int. Cl.
*E05B 83/18* (2014.01)
*E05B 85/20* (2014.01)

(52) U.S. Cl.
CPC ..... *B60N 2205/20* (2013.01); *Y10T 292/1043* (2015.04)

(58) Field of Classification Search
CPC ........ Y10T 292/1045; Y10T 292/1047; B60N 2/366; B60N 2/01516; B60N 2/01583; B60N 2/2245; B60N 2/36; B60N 2205/20; Y10S 292/23; Y10S 292/56; Y10S 292/57; Y10S 292/61; Y10S 292/73; E05B 77/36; E05B 77/38; E05B 83/18; E05B 85/20
USPC ................................ 297/378.12, 378.13, 336
See application file for complete search history.

(56) References Cited

U.S. PATENT DOCUMENTS

| | | | | |
|---|---|---|---|---|
| 3,394,956 A * | 7/1968 | Zaydel | ................. | E05B 77/48 292/216 |
| 3,545,800 A * | 12/1970 | Alfonsas | ............ | E05B 85/243 292/216 |
| 4,643,470 A * | 2/1987 | Kazuyuki | ............ | E05B 83/16 292/216 |
| 5,150,933 A * | 9/1992 | Myslicki | ................. | E05B 83/16 292/216 |
| 5,730,480 A * | 3/1998 | Takamura | .......... | B60N 2/01583 248/503.1 |
| 6,012,747 A * | 1/2000 | Takamura | .............. | B60N 2/366 292/216 |
| 6,422,616 B1 | 7/2002 | Wortmann et al. | | |
| 6,581,987 B1 | 6/2003 | Gentile et al. | | |
| 6,629,710 B1 * | 10/2003 | Shafry | ............... | B60N 2/01583 292/216 |
| 6,945,585 B1 * | 9/2005 | Liu | .................... | B60N 2/01583 292/216 |
| 7,762,605 B2 * | 7/2010 | Otsuka | ............... | B60N 2/01583 248/503.1 |
| 8,029,030 B2 * | 10/2011 | Shimura | ............ | B60N 2/01583 292/216 |
| 2006/0006669 A1* | 1/2006 | Nelsen | ................ | E05B 17/0037 292/216 |
| 2008/0060397 A1* | 3/2008 | Sato | .................... | B60N 2/01583 70/237 |
| 2011/0169279 A1* | 7/2011 | Ishikawa | ............ | B60N 2/01583 292/96 |
| 2011/0174027 A1* | 7/2011 | Ookawara | ............... | E05B 83/30 70/159 |
| 2013/0129413 A1* | 5/2013 | Dryburgh | ........... | B60N 2/01583 403/316 |

OTHER PUBLICATIONS

International Search Report and Written Opinion dated May 3, 2013 issued from the Canadian Intellectual Property Office relating to corresponding PCT International Application No. PCT/CA2013/000134.

* cited by examiner

OVERSLAM BUMPER FOR VEHICLE DOOR LATCH

CROSS-REFERENCE

This application is a Continuation Application of PCT International Application No. PCT/CA2013/000134 filed Feb. 15, 2013, which claims the benefit of U.S. Provisional Application No. 61/600,314 filed Feb. 17, 2012, the contents of which are incorporated herein in their entirety.

FIELD

The present invention relates to vehicle latch systems.

BACKGROUND

These noises can result from the passenger seat vibrations preventing the ratchet and the pawl from remaining firmly in contact with one another in the closing position. In particular, the passenger seat vibration can cause oscillations of the ratchet around the closed position. In these oscillations, the ratchet, when set in the closing position, repeatedly moves away from the pawl along a so-called "over-travel" stroke and then periodically hits the pawl, thus producing a rattling contact noise. In order to reduce this noise, it has been proposed to provide the ratchet and the pawl with bumpers which reduce the over-travel of the ratchet. However, the damping properties of these bumpers are heavily affected by variation of temperature and are not constant during the lifecycle of the closure assembly because the elastomeric material of the bumpers has a certain degree of hysteresis.

SUMMARY

It is an object to the present invention to provide a latch configured to obviate or mitigate at least one of the above-mentioned problems.

A first aspect provided is a closure panel latch assembly including an overslam bumper mechanism, comprising: a biasing element as a spring formed from a metallic material positioned relative to a slot of the latch assembly such that the biasing element resists entry of a striker into the slot beyond a selected position in order to inhibit contact of the striker with a bottom end of the slot.

A second aspect provided is a closure panel latch assembly comprising: a biasing element as a resilient element positioned relative to a slot of the latch assembly; a striker engagement member coupled to the biasing element, the striker engagement member positioned to engage the striker and resist travel of the striker towards the bottom end, wherein the biasing element controls the resistance to movement of the striker engagement member by the striker.

BRIEF DESCRIPTION OF THE DRAWINGS

The foregoing and other aspects will be more readily appreciated having reference to the drawings, wherein.

DETAILED DESCRIPTION OF THE PREFERRED EMBODIMENTS

Figure 1:
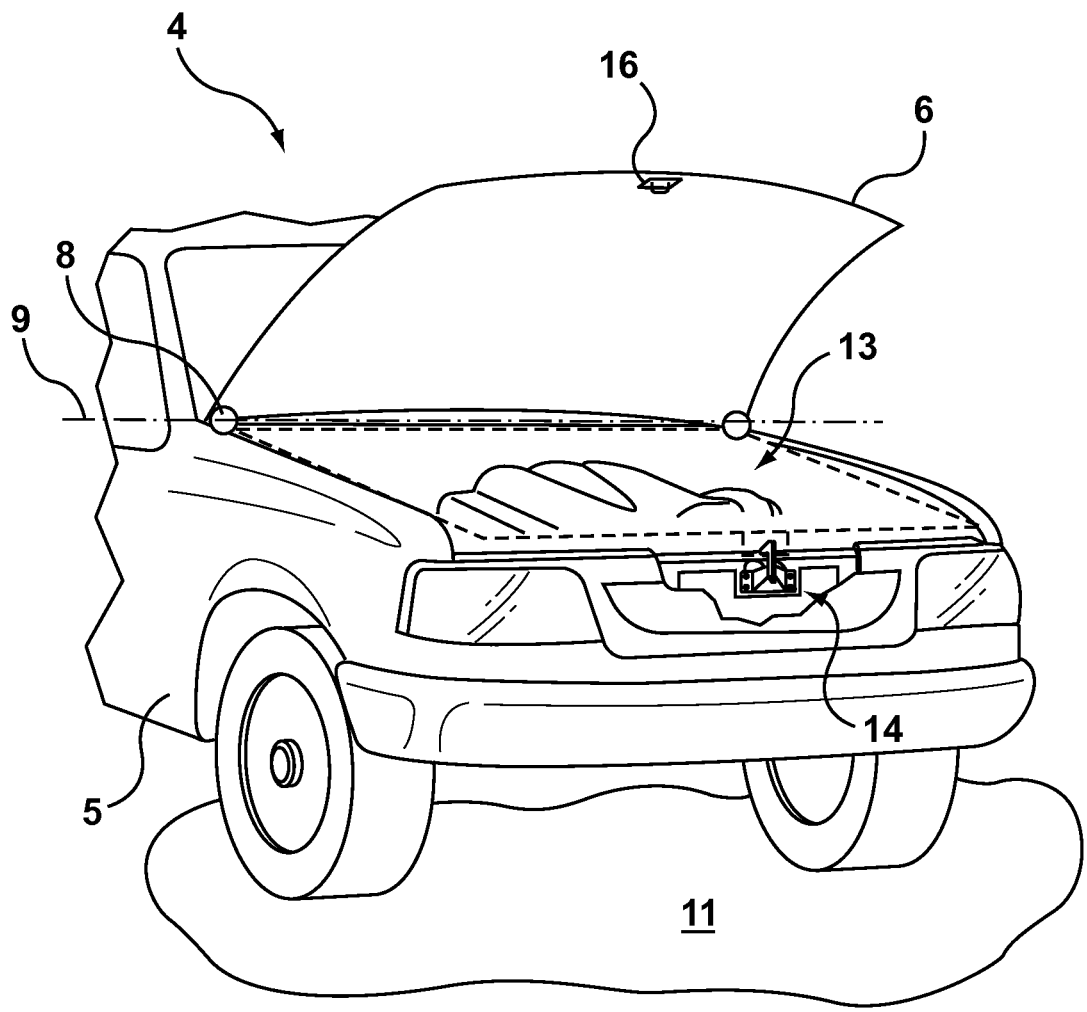
FIG. 1 is a perspective view of a vehicle with an example latch system for a closure panel.

Referring to FIG. 1, shown is a vehicle 4 with a vehicle body 5 having one or more closure panels 6. The closure panel 6 can be connected to the vehicle body 5 via one or more hinges 8 and retained by a latch assembly 14 in a closed position once closed. It is also recognized that the hinge 8 can be configured as a biased hinge that can be configured to bias the closure panel 6 towards an open position and/or towards the closed position. Further, the hinge 8 can be configured as a lift assist system including one or more struts, not shown, for example used in tail lift gate systems. The closure panel 6 can have a mating latch component 16 (e.g. striker) mounted thereon for coupling with a respective latch assembly 14 mounted on the vehicle body 5. Alternatively, the latch assembly 14 can be mounted on the closure panel 6 and the mating latch component 16 mounted on the body 5 (not shown).

The hinges 8 provide for movement of the closure panel 6 between a closed panel position (shown in dashed outline) and an open panel position (shown in solid outline). In the embodiment shown, the closure panel 6 pivots between the open panel position and the closed panel position about a pivot axis 9 (e.g. of the hinge 8), which can be configured as horizontal or otherwise parallel to a support surface 11 of the vehicle 4. In other embodiments, the pivot axis 9 may have some other orientation such as vertical or otherwise extending at an angle outwards from the support surface 11 of the vehicle 4. In still other embodiments, the closure panel 6 may move in a manner other than pivoting, for example, the closure panel 6 may translate along a predefined track or may undergo a combination of translation and rotation between the open and closed panel positions, such that the hinge 8 includes both pivot and translational components (not shown). As can be appreciated, the closure panel 6 can be embodied, for example, as a hood, passenger door or lift gate (otherwise referred to as a hatch) of the vehicle 4.

For vehicles 4, the closure panel 6 can be referred to as a partition or door, typically hinged, but sometimes attached by other mechanisms such as tracks, in front of an opening 13 which is used for entering and exiting the vehicle 4 interior by people and/or cargo. It is also recognized that the closure panel 6 can be used as an access panel for vehicle 4 systems such as engine compartments and also for traditional trunk compartments of automotive type vehicles 4. The closure panel 6 can be opened to provide access to the opening 13, or closed to secure or otherwise restrict access to the opening 13. It is also recognized that there can be one or more intermediate open positions (e.g. unlatched position) of the closure panel 6 between a fully open panel position (e.g. unlatched position) and fully closed panel position (e.g. latched position), as provided at least in part by the hinge(s) 8 and assembly 14. For example, the hinges 8 can be used to provide an opening force (or torque) and/or a closing force (or torque) for the closure panel 6.

In terms of vehicles 4, the closure panel 6 may be a hood, a lift gate, or it may be some other kind of closure panel 6, such as an upward-swinging vehicle door (i.e. what is sometimes referred to as a gull-wing door) or a conventional type of door that is hinged at a front-facing or back-facing edge of the door, and so allows the door to swing (or slide)

away from (or towards) the opening 13 in the body 5 of the vehicle 4. Also contemplated are sliding door embodiments of the closure panel 6 and canopy door embodiments of the closure panel 6, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 4 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the body 5 of the vehicle at the front, side or back of the door, as the application permits. It is recognized that the body 5 can be represented as a body panel of the vehicle 4, a frame of the vehicle 4, and/or a combination frame and body panel assembly, as desired.

Figure 2:
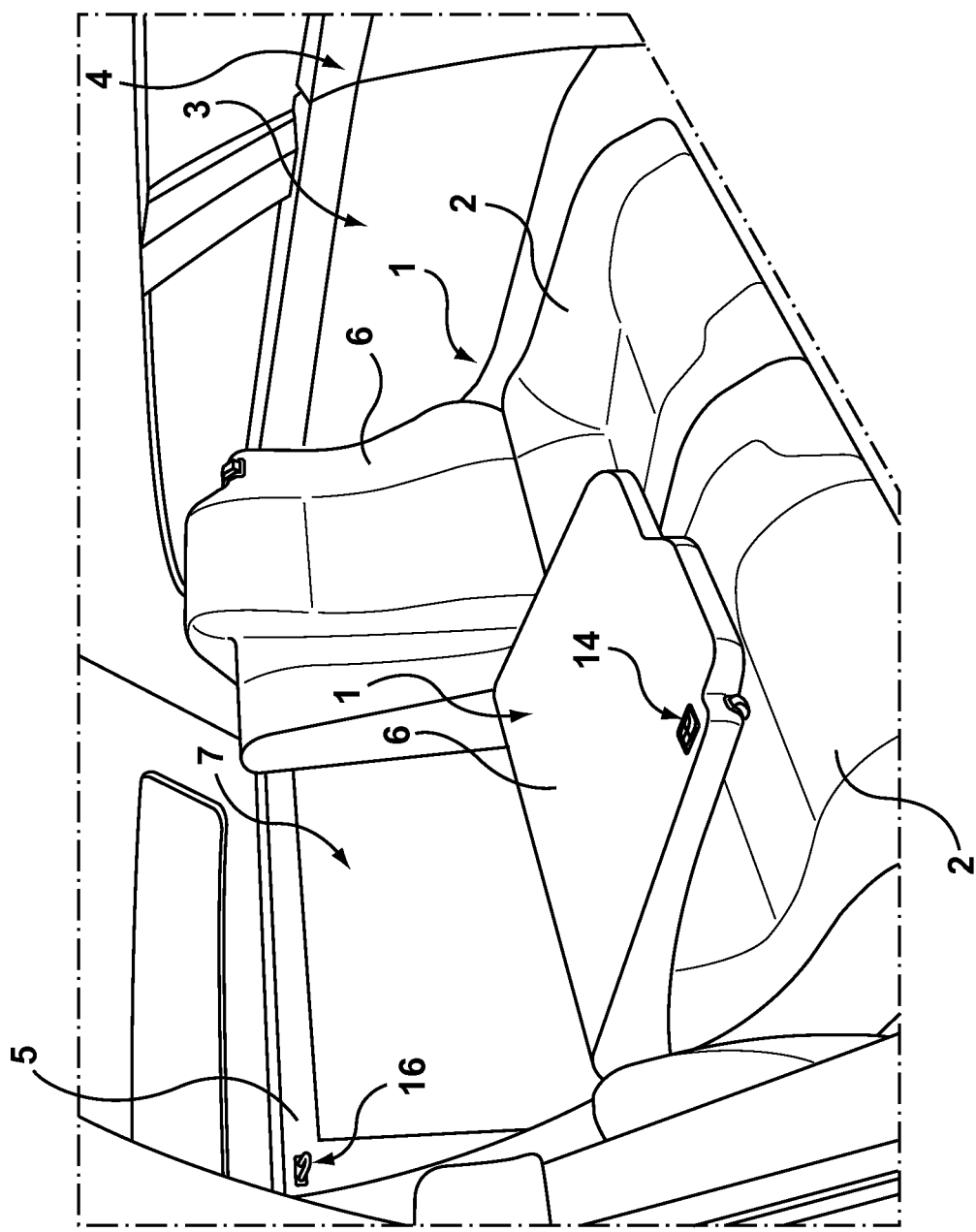
FIG. 2 is an alternative embodiment of the closure panel of FIG. 1.

Referring to FIG. 2, as is known, motor vehicles 4 may comprise a passenger area 3 and a cargo area 7 which are separated from each other by one or more passenger seats, typically rear passenger seats 1. Those rear passenger seats 1 substantially comprise a fixed seat base 2 and a seatback 6 which is pivotally hinged relative to the seat 2. Referring again to FIG. 2, shown is another example of the closure panel 6 embodied as the seatback 6. The motor vehicle 4 comprises a passenger area 3 and a cargo area 7. In detail, each seat 1 comprises a seat part 2 and the seatback 6, which is articulated to seat part 2, for example by means of a hinge (not shown). Each seat 1 may be selectively set in: a raised position in which seatback 6 is upright (e.g. closed access to the cargo area 7), so as to inhibit a direct and easy access from passenger area 3 to cargo area 7; and—a lowered position (e.g. open access to the cargo area 7) in which seatback 6 is folded over seat part 2, so as to provide an easy and direct access from passenger area 3 to cargo area 7.

Each seatback 6 further comprises a latch assembly 14 which is selectively operated to fix seatback 6 in the upright position. The latch assembly 14 is adapted to releasably engage the striker 16, which is mounted on the vehicle body 5. Therefore, as one embodiment, the closure panel 6 is the seatback 6, such that foldable rear passenger seats 1 can be selectively moved between: a raised position in which the seatback 6 is upright, so as to separate the passenger area 3 from the cargo area 7; and a lowered position in which the seatback 6 is folded over the seat part 2, so as to provide access from the passenger area 3 to the cargo area 7. In order to lock the foldable rear passenger seat 1 in the raised position, the motor vehicle 4 comprises: the striker 16 fixed to a frame of the vehicle body 5; and the latch assembly 14 cooperating with the striker 16 and carried by the seatback 6 of the seat 1. It is also recognized that seatback 6 can contain the striker 16 and the frame of the vehicle body 5 can contain the latch assembly 14, as desired.

Figure 3:
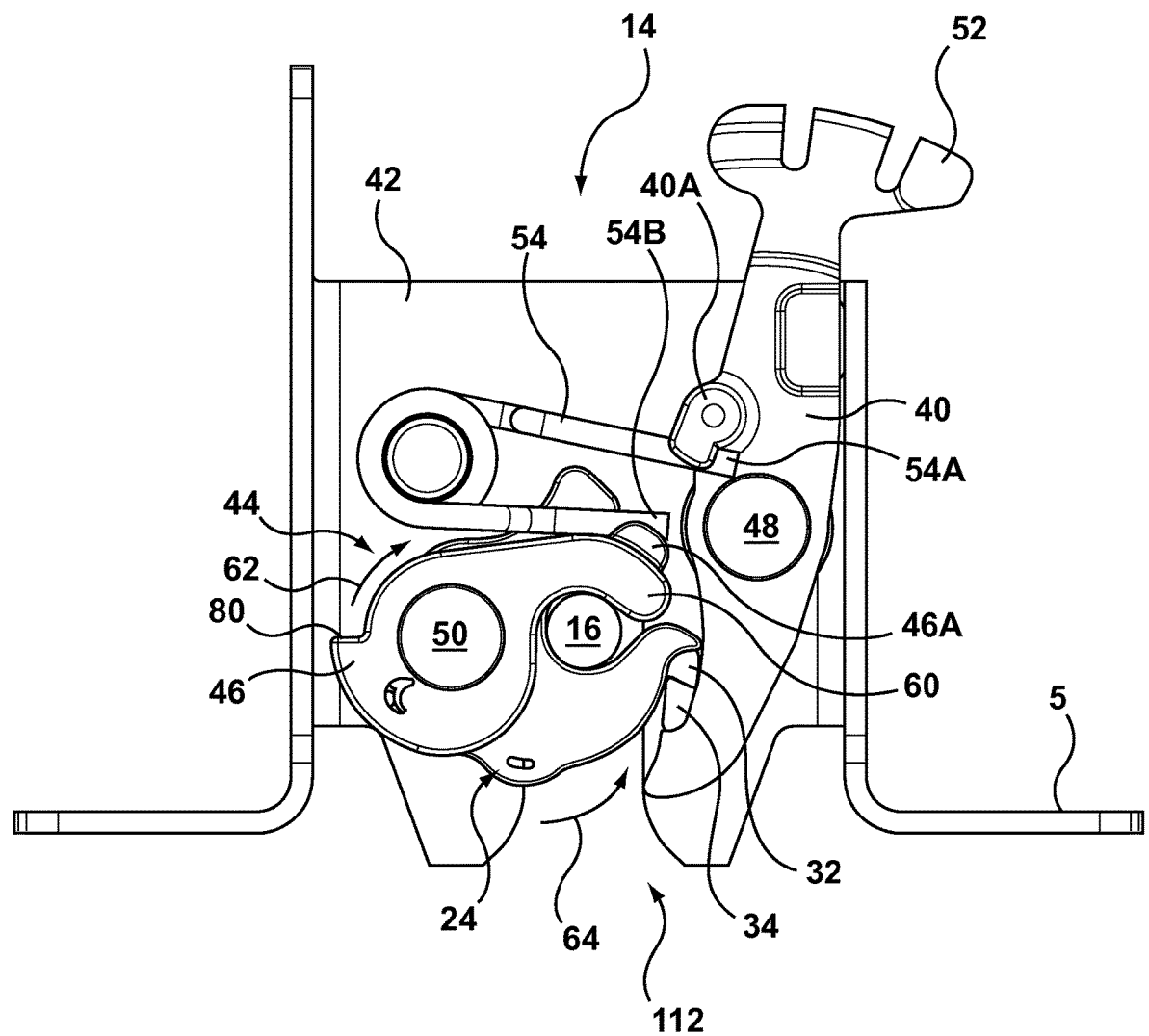
FIG. 3 is a front view of an example latch assembly.
Figure 4:
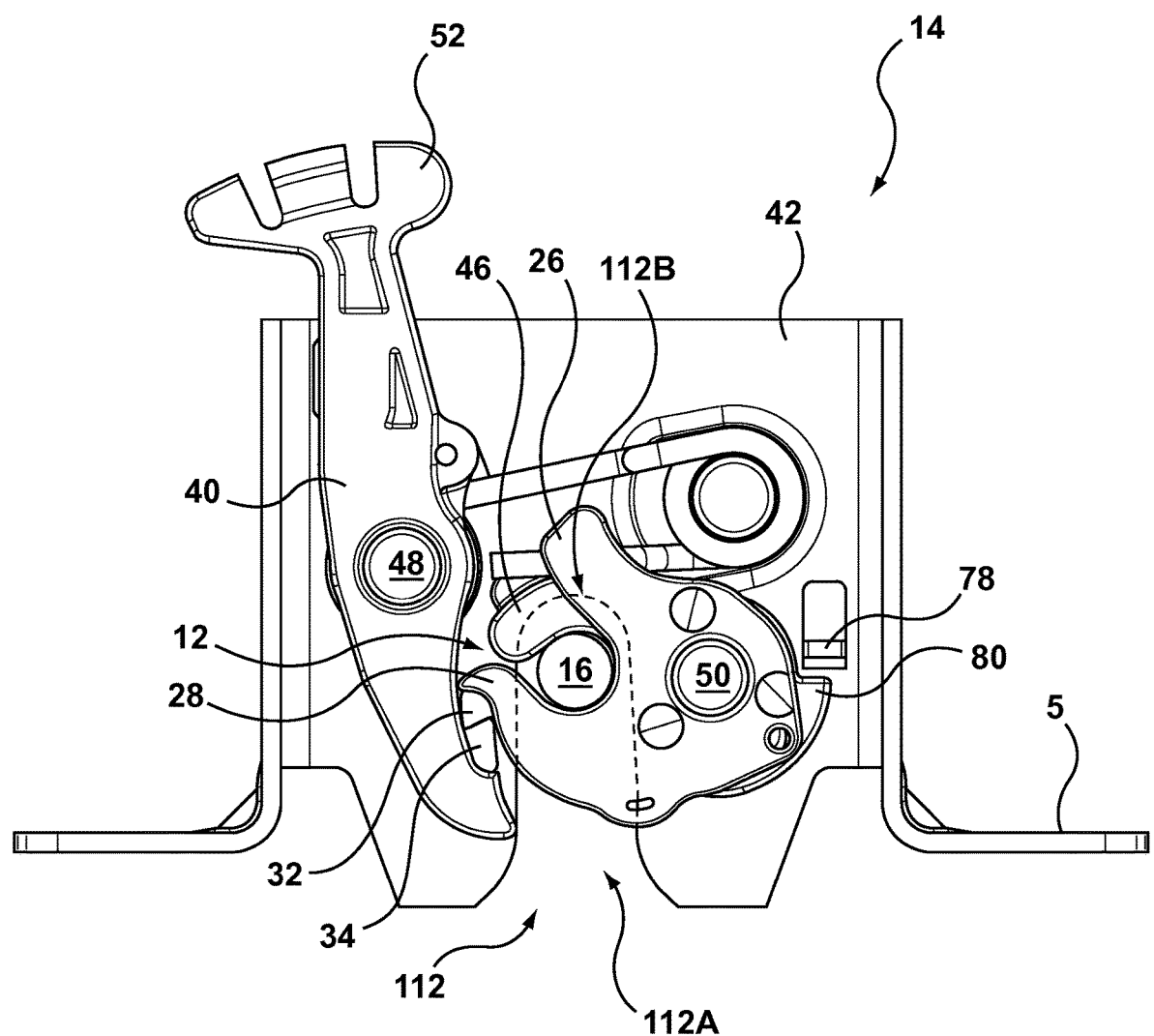
FIG. 4 is a back view of the latch assembly of claim 3.

Referring to FIGS. 3 and 4, more in detail, the latch assembly 14 can include: a ratchet 24 which defines an open cylindrical seat referred to as a slot 12 that cooperates with slot or fish mouth 112 of a mounting plate 42; and a pawl 40. The latch assembly 14 can include a mounting plate 42 that can be contoured to facilitate attachment of the latch assembly 14 to the frame (e.g. vehicle body 5) of the motor vehicle 4 (see FIG. 1). The mounting plate 42 can be contoured to define a generally planar mounting surface and a plurality of apertures for attaching various components of the latch assembly 14 thereto. Preferably, mounting plate 42 can be a stamped metal component.

Referring to FIGS. 1 and 2, the mating latch component 16 (e.g. striker) can secured to the closure panel 6 or the vehicle body 5 (e.g. hood or seat) and extend outwardly therefrom. The mating latch component 16 can be a generally U-shaped bar that is engaged by the ratchet 24 (see FIGS. 3,4) to latch the closure panel 6 in the closed position when the mating latch component 16 travels into the slot 112. The latch assembly 14 can be secured to the vehicle body 5 (or the closure panel 6) by the mounting plate 42 and positioned so that the mating latch component 16 will engage the ratchet 24 upon the closure panel 6 reaching the closed position. Positioned on the mounting plate 42 is the fish mouth or slot 112 for receiving the mating latch component 16 therein, in other words the slot 112 of the latch assembly 14 is configured for receiving a keeper of the mating latch component 16. The slot 112 has an open top end 112A and a closed bottom end 112B (see FIG. 4). Preferably, the mating latch component 16 is inhibited during travel in the slot 112 from contacting the bottom end 112B.

The latch assembly 14 includes a number of latch elements 44 (e.g. a ratchet 24 and a pawl 40) that are configured to couple with the mating latch component 16 in order to cooperatively retain the mating latch component 16 within the slot 112 when the closure panel 6 is in the closed position (e.g. locked). The latch elements 44 can be pivotally secured to the mounting plate 42, for example at pivots 48,50. The ratchet 24 includes an arm 26 and arm 28 spaced apart to define the generally u-shaped slot 12 there between. The ratchet 24 also includes a shoulder stop 32 configured for engaging with a corresponding shoulder stop 34 of the pawl 40. Note that in FIGS. 3 and 4, the latch assembly 14 is shown in the closed position (e.g. facilitating the retention of the mating latch component 16 in the slots 12,112). Also shown as part of the components 44 is a striker engagement member 46 configured for rotation about pivot 50, as further described below.

The ratchet 24 is biased to the open (e.g. unlatched) position, in order to facilitate release of the mating latch component 16 from the slot 12 upon movement of the closure panel 6 from the closed position, by a ratchet biasing element (e.g. torsion spring—not shown) that is mounted on the pivot 50 and connected to the mounting plate 42. The torsion spring is an example of the ratchet biasing element, which biases the ratchet 24 towards the open position thereby aligning the arms 26,28 with either side of the slot 112. Accordingly, the ratchet 24 moves between an unlatched position for releasing the mating latch component 16 and a latched position (shown). As such, the act of mating latch component 16 traveling from the mouth 112A of the slot 112 towards the bottom 112B (as the closure panel 6 travels towards the closed position) acts against the bias of the ratchet biasing element and forces rotation of the ratchet 24 about the pivot 50 as the ratchet 24 rotates to the closed position shown.

In the closed position, the pawl 40 has the shoulder 34 (or detent) that interacts or otherwise engages with the shoulder stop 32 of the ratchet 24, in order to releasably retain the ratchet 24 in the latched position. The pawl 40 can be biased to the locking/latched position (where the ratchet 24 is shown in a primary closed position) by a pawl biasing element (e.g. torsion spring—not shown) that can be mounted on pivot 48. Alternatively, the pawl 40 can be biased by a biasing element 54 (e.g. a leaf spring or coil spring) that can be mounted between the pawl 40 on a pawl tab 40A and striker engagement member 46 by tab 46A. It is also recognized that the biasing element 54 can be other than a spring, for example a resilient element that provides resistance in compression or tension and formed of polymeric material (e.g. rubber or the like). Element end 54A of the biasing element 54 can be supported and slidably received in pawl tab 40A and element end 54B can be supported and slidably received in tab 46A. Accordingly, the pawl 40 is biased to engage with the ratchet 24 via the biasing element 54, such that the shoulder stop 34 is biased by the biasing element 54 to rotate about pivot 48 towards pivot 50.

The pawl 40 also features a release tab 52 that can be used to act against the bias of the pawl biasing element (e.g. biasing element 54) and to thereby force rotation of the pawl 40 about pivot 48 and move shoulder stop 34 out of engagement with shoulder stop 32 and away from pivot 50. The release tab 52 can be connected to a release cable (not shown) that is connected to a handle (not shown) located in the vehicle 4 compartment for initiating by a driver for opening of the latch assembly 14. Alternatively, in the case of the seatback 6 embodiment, the release tab 52 can be actuated manually by a hand of the vehicle operator. The end result of operation of the release tab 52 is that the pawl 40 is disengaged with the ratchet 24, under action against the biasing member 54, thus allowing the ratchet biasing element to assist in pivoting the ratchet 24 from the closed (or latched position—see FIGS. 3,4) to the open or unlatched position.

Referring to FIG. 3, the striker engagement member 46 can be positioned on the pivot 50 and include a hook portion 60 for cradling or otherwise supporting the mating latch component 16 in the slot 12 of the ratchet 24 when the ratchet 24 is in the closed position. As such, the biasing element 54 biases the striker engagement member 46 towards the mating latch component 16 when the mating latch component 16 is retained in the slot 12 by the ratchet 24. In the embodiment shown, the biasing element 54 can provide bias both for the pawl 40 (i.e. acting as the pawl biasing element) and bias for the striker engagement member 46 40 (i.e. acting as a striker engagement biasing element). Alternatively, the pawl 40 can have a separate pawl basing element (not shown) and biasing element 54 is used only to bias the striker engagement member 46, such that the element end 54A of the biasing element 54 can be supported and slidably received by a tab (not shown) of the mounting plate 42 and element end 54B can remain supported and slidably received in tab 46A of the striker engagement member 46. As such, biasing of the striker engagement member 46 by the biasing element can be configured so as to inhibit travel of the mating latch component 16 in the slot 112 from contacting the bottom end 112B.

Referring again to FIGS. 3 and 4, a detent 78 of the mounting plate 42 cooperates with a shoulder stop 80 of the striker engagement member 46, so as to limit travel of the striker engagement member 46 away from the bottom end 112B. in this manner, the cooperation of the detent 78 and the shoulder stop 80 provides for proper positioning of the striker engagement member 46 relative to the bottom end 112B, so as for the striker engagement member 46 to be ready to receive the mating latch component 16 when same travels towards the bottom end 112B. As such, the cooperation of the detent 78 and the shoulder stop 80 limits rotation of the striker engagement member 46 about pivot 50.

Advantageously, in order to inhibit oscillating contact between the ratchet 24 and the pawl 40, the striker engagement member 46 can be biased by the biasing element 54 in a first direction 62 about pivot 50 into contact with the mating latch component 16 when the mating latch component 16 is in the slot 12 of the ratchet 24. Simultaneously, the ratchet 24 is biased in a second direction 64 about pivot 50 into contact with the mating latch component 16 when the mating latch component 16 is in the slot 12 of the ratchet 24, such that the first direction 62 is opposite to the second direction 64. For example, the pawl 40 biases the ratchet 24 in the second direction 64 due to interaction of the shoulder stops 32,34, due to the force of the pawl biasing element. In the embodiment shown in FIGS. 3 and 4, the biasing element 54 provides the bias for the pawl 40 about pivot 48 as well as the bias of the striker engagement member 46 about the pivot 50. However it is recognized that the pawl 40 could be biased by a pawl biasing element (not shown) that is separate from the biasing element 54, such that the biasing element 54 is a first biasing member for biasing the striker engagement member 46 about the pivot 50 and the pawl biasing element is a second biasing element for biasing the pawl 40 about pivot 48. Further, the engagement of the striker engagement member 46 with the mating latch component 16 can help to reduce vibration induced noise when mating latch component 16 is encouraged to oscillate in the slot 12 of the ratchet 24 when the latch assembly 14 and/or mating latch component 16 experiences vibration transferred from the body 5 of the vehicle 4.

Figure 5:
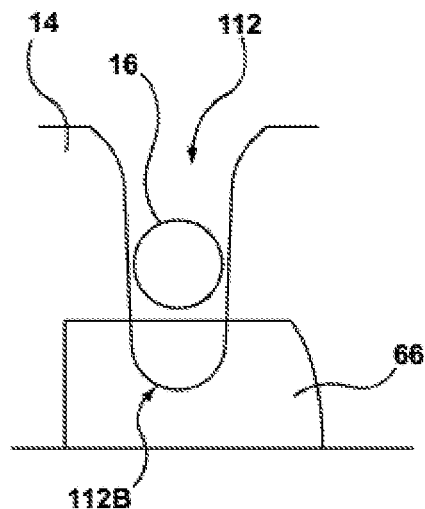
FIG. 5 is an alternative embodiment of the latch assembly of FIG. 3.

Reference is made to FIG. 5, which shows a solid material (e.g. rubber) overslam bumper 66 mounted in the slot 112 of a latch assembly 14. When the striker 16 is received in the slot 112, the striker 16 will be cushioned by the bumper 66 and therefore inhibited from travelling towards and making undesirable contact with the bottom 12B of the slot 112. However, rubber bumpers such as bumper 66 can suffer from significant changes in their elasticity with changes in temperature, and as such the degree of cushioning the potential contact with the bottom 112B of the slot 112 can vary with environmental conditions and/or age of the overslam bumper 66.

Figure 6:
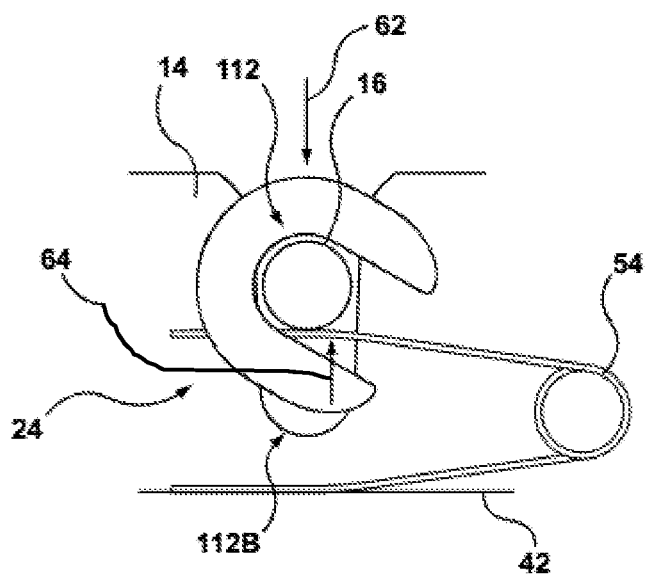
FIG. 6 is a further alternative embodiment of the latch assembly a FIG. 3.

Referring to FIG. 6, an alternative embodiment of the biasing element 54 is provided as a spring for inhibiting contact of the striker 16 with the bottom 112B of the slot 112. The biasing element 54 as a spring can be made from any suitable material, such as a suitable steel. In the embodiment shown in FIG. 6, the biasing element 54 is a torsion spring, however, other types of spring may be used, such as a leaf spring or a compression spring. The biasing element 54 can further include a striker engagement member 46, which is connected to the biasing element 54 and which engages the striker 16 to resist bottoming out of the striker 16 in the slot 112 during closing of the closure panel 6 (see FIG. 1). The latch components 44 (see FIG. 4) of the latch assembly 14 can cooperate with the striker 16 to retain the striker 16 in the slot 112 once received therein. As discussed above, the arm 26 of the ratchet 24 is biased towards engagement with the striker 16 in one direction 62 while the striker 16 is biased by the biasing element 54 towards the arm 26 of the ratchet 24 in the other direction 64, thereby advantageously inhibiting noise from induced vibration experienced by the latch assembly 14 and/or striker 16. As such, the biasing element 54 can provide for overslam protection and/or for vibration reduction. Alternatively, the biasing element 54 can directly contact the striker 16 without the use of the striker engagement member 46 (not shown).

The striker engagement member 46 can be an arm that is integral with the biasing element 54 as shown in FIG. 6. Alternatively it can be a separate member as shown in FIGS. 3 and 4. In embodiments wherein the striker engagement member 46 is a metallic member or some other material that may be prone to generating noise when struck by the striker 16, overmolding of a polymeric material may be provided on the striker engagement member 46 to help reduce such noise. Alternatively some other means of noise reduction on the striker engagement member 46 can be provided, such that the body itself of the striker engagement member 46 is composed of a suitable polymeric material. By using a spring such as a torsion spring (and more particularly a metallic torsion spring) for the biasing element 54, the performance of the biasing element 54 as an overslam bumper can be relatively more consistent over a large range of temperatures, as compared to some polymeric bumpers. In some embodiments, the striker engagement member 46 may be omitted and the biasing element 54 may directly engage the striker 16.

Figure 7:
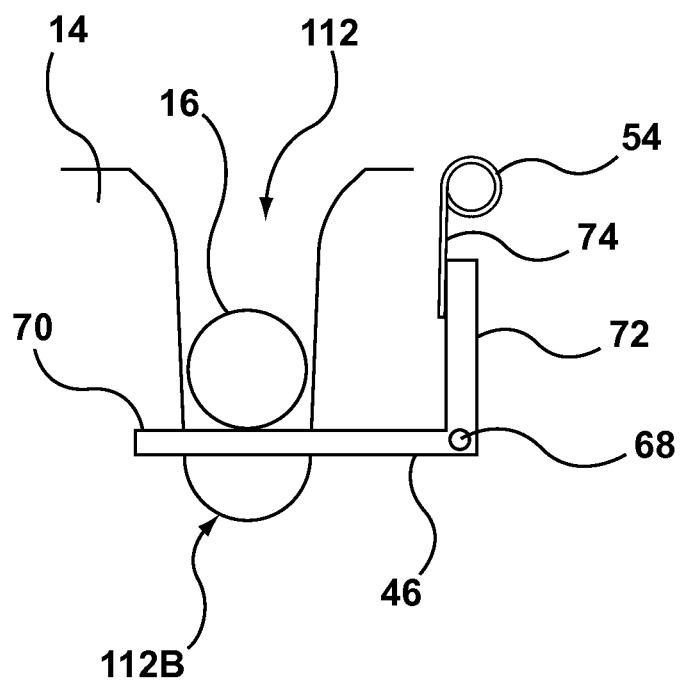
FIG. 7 is another alternative embodiment of the latch assembly of FIG. 3.

In another embodiment shown in FIG. 7, the biasing element 54 is provided and a striker engagement member 46 is provided, in the form of a lever that pivots about pivot 68. The striker engagement member 46 has a first end 70 that engages the striker 16 (and may be overmolded to reduce noise) and has a second end 72 that engages the biasing element 54, via a spring arm 74. The embodiment shown in FIG. 7 shows that the biasing element 54 can be positioned remotely from the slot 112 for packaging reasons. Furthermore, the lever arm 72 may be configured to provide a selected resistance to movement during engagement with the striker 16, based on such factors as the force characteristics of the biasing element 54 and the geometric relationships involved. Thus the striker engagement member 46 can be tuned for the performance of the overslam bumper, depending upon the geometrical and material properties of the ends 70,72, pivot 68 there-between, and/or the arm 74. In use, as can be seen, the biasing element 54 is positioned to resist movement of the striker 16 beyond a selected position in the slot 112 spaced apart from the bottom 112B. Ultimately the position of the striker 16 in the slot 112 when the closure panel 6 is closed can be a position which causes some flexure of the biasing element 54.

While the above description constitutes a plurality of embodiments of the present invention, it will be appreciated that the present invention is susceptible to further modification and change without departing from the fair meaning of the accompanying claims.

The invention claimed is:

1. A closure panel latch assembly configured to inhibit travel of a striker from contacting a closed bottom end when in a slot of a mounting plate of the latch assembly, the latch assembly comprising:
    the mounting plate, the slot having an open top end and the closed bottom end;
    a ratchet pivotally mounted to the mounting plate and configured to couple with the striker to displace the striker in the slot by a ratchet biasing element biasing the ratchet in order to move the striker from a closed position towards an open position located at the open top end of the slot; and
    an overslam bumper mechanism including:
    a biasing element positioned relative to the slot, the biasing element resisting entry of the striker into the slot beyond the closed position in order to inhibit contact of the striker with the closed bottom end of the slot by biasing travel of the striker in a first direction while the striker biases travel of the ratchet towards the closed bottom end in a second direction, the second direction is opposite to the first direction; and
    a limiting arrangement to limit travel of a striker engagement member of the overslam bumper mechanism away from the closed bottom end of the slot;
    wherein the striker is distanced from the closed bottom end by the overslam bumper mechanism when the striker is in the closed position, such that the striker is inhibited from contacting the closed bottom end of the slot;
    wherein one end of the biasing element is coupled to a pawl and another end of the biasing element is coupled to the striker engagement member of the overslam bumper mechanism, such that the biasing element provides a bias for the striker engagement member towards the striker and a bias for the pawl towards the ratchet, thereby forcing the ratchet against the striker when the striker is in the closed position.

2. The closure panel latch assembly as claimed in claim 1, wherein the striker engagement member is positioned between the closed bottom end and the striker when the striker is in the slot in order to engage the striker and resist travel of the striker towards the closed bottom end of the slot, wherein the biasing element controls a resistance to movement of the striker engagement member by the striker.

3. The closure panel latch assembly of claim 2, wherein the ratchet is biased in the second direction and the striker engagement member is biased in the first direction, such that both the ratchet and the striker engagement member are biased towards the striker in the opposing first and second directions when the striker is in the closed position.

4. The closure panel latch assembly of claim 3, wherein the striker engagement member and the ratchet are mounted on a same pivot.

5. The closure panel latch assembly of claim 1, wherein the one end of the biasing element is supported and slidably received in a tab of the pawl and the other end of the biasing element is supported and slidably received in a tab of the striker engagement member.

6. The closure panel latch assembly of claim 1, wherein the latch assembly and striker are associated with a closure panel of a vehicle.

7. The closure panel latch assembly of claim 6, wherein the closure panel is a hood.

8. The closure panel latch assembly of claim 6, wherein the closure panel is a door.

9. The closure panel latch assembly of claim 6, wherein the closure panel is a seatback.

10. The closure panel latch assembly as claimed in claim 1, wherein the limiting arrangement comprises a detent and a stop, wherein the detent and stop cooperate with one another to limit travel of the striker engagement member away from the closed bottom end of the slot.

11. The closure panel latch assembly of claim 10 wherein the mounting plate includes the detent for cooperating with the stop located on the striker engagement member, wherein engagement of the detent with the stop limits travel of the striker engagement member away from the closed bottom end of the slot.

12. The closure panel latch assembly of claim 10, wherein the striker engagement member comprises a hook portion that is configured for cradling the striker when the striker is coupled to the ratchet.

13. A closure panel latch assembly configured to inhibit travel of a striker from contacting a closed bottom end when in a slot of a mounting plate of the latch assembly, the latch assembly comprising:
    the mounting plate, the slot having an open top end and the closed bottom end;
    a ratchet pivotally mounted to the mounting plate and configured to couple with the striker to displace the striker in the slot by a ratchet biasing element biasing the ratchet in order to move the striker from a closed position towards an open position located at the open top end of the slot; and an overslam bumper mechanism including:

a resilient element positioned relative to the slot;

a striker engagement member coupled to the resilient element, the striker engagement member positioned between the closed bottom end and the striker when the striker is in the slot in order to engage the striker and resist travel of the striker towards the closed bottom end of the slot, wherein the resilient element controls a resistance to movement of the striker engagement member by the striker by biasing the striker engagement member in a first direction while the striker biases movement of the ratchet towards the closed bottom end in a second direction, the second direction is opposite to the first direction;

a limiting arrangement to limit travel of the striker engagement member away from the closed bottom end of the slot;

wherein the striker is distanced from the closed bottom end by the overslam bumper mechanism when the striker is in the closed position, such that the striker is inhibited from contacting the closed bottom end of the slot; and wherein one end of the resilient element is coupled to a pawl and another end of the resilient element is coupled to the striker engagement member of the overslam bumper mechanism, such that the resilient element provides a bias for the striker engagement member towards the striker and a bias for the pawl towards the ratchet, thereby forcing the ratchet against the striker when the striker is in the closed position.

14. The closure panel latch assembly of claim 13 wherein the ratchet is biased in the second direction and the striker engagement member is biased in the first direction, such that both the ratchet and the striker engagement member are biased towards the striker in the opposing first and second directions when the striker is in the closed position.

15. The closure panel latch assembly of claim 13, wherein the resilient element is a spring formed of a metallic material.

16. The closure panel latch assembly of claim 13, wherein the resilient element provides said resistance to travel of the striker into the slot beyond the closed position in order to inhibit contact of the striker with the closed bottom end of the slot.

* * * * *